United States Patent
Krause et al.

(10) Patent No.: US 8,660,864 B2
(45) Date of Patent: Feb. 25, 2014

(54) SYSTEMS AND METHODS FOR INTELLIGENT UNDERWRITING BASED ON COMMUNITY OR SOCIAL NETWORK DATA

(75) Inventors: Jacqueline LeSage Krause, West Hartford, CT (US); Anthony J. Grosso, Suffield, CT (US); David F. Peak, Avon, CT (US); Eugene J. Walters, Avon, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/291,609

(22) Filed: Nov. 8, 2011

(65) Prior Publication Data

US 2012/0221357 A1 Aug. 30, 2012

Related U.S. Application Data

(60) Provisional application No. 61/447,372, filed on Feb. 28, 2011.

(51) Int. Cl.
*G06Q 40/00* (2012.01)

(52) U.S. Cl.
USPC .......................................................... 705/4

(58) Field of Classification Search
USPC ............ 705/4, 319, 38, 2, 347; 709/217, 224; 1/1
See application file for complete search history.

(56) References Cited

U.S. PATENT DOCUMENTS

| | | | | |
|---|---|---|---|---|
| 8,108,501 | B2 * | 1/2012 | Birnie et al. ................ | 709/223 |
| 8,296,356 | B2 | 10/2012 | Obasanjo et al. | |
| 8,340,983 | B2 * | 12/2012 | Grover et al. ................ | 705/4 |
| 2002/0188484 | A1 * | 12/2002 | Grover et al. ................ | 705/4 |
| 2002/0194033 | A1 * | 12/2002 | Huff ........................... | 705/4 |
| 2007/0226014 | A1 * | 9/2007 | Alemayehu et al. ....... | 705/4 |
| 2008/0104227 | A1 * | 5/2008 | Birnie et al. ................ | 709/224 |
| 2008/0281726 | A1 | 11/2008 | Gupta | |
| 2008/0288298 | A1 | 11/2008 | Dattatreya et al. | |
| 2009/0037211 | A1 * | 2/2009 | McGill et al. .............. | 705/1 |
| 2011/0112957 | A1 | 5/2011 | Ingram et al. | |
| 2011/0153368 | A1 * | 6/2011 | Pierre et al. ................ | 705/4 |
| 2011/0159890 | A1 * | 6/2011 | Fortescue et al. .......... | 455/456.2 |
| 2011/0161119 | A1 * | 6/2011 | Collins ....................... | 705/4 |
| 2011/0320341 | A1 * | 12/2011 | Kremen ...................... | 705/38 |
| 2011/0320342 | A1 * | 12/2011 | Kremen ...................... | 705/38 |
| 2012/0221357 | A1 * | 8/2012 | Krause et al. .............. | 705/4 |
| 2012/0290329 | A1 * | 11/2012 | Ross ........................... | 705/4 |

OTHER PUBLICATIONS

Anonymous "News-Social Networking" Oct. 23, 2008, Post Magazine, p. 3.*
Scism et al. "Insurers Test Data Profiles to Identify Risky Clients" Nov. 19, 2010, Wall Street Journal.*

* cited by examiner

*Primary Examiner* — Kelly Campen
(74) *Attorney, Agent, or Firm* — Howard IP Law Group, PC

(57) ABSTRACT

A system for underwriting using community and/or social networking based data includes an automated insurance underwriting platform for rating and pricing insurance policies through the accessing and evaluating of community, social and business network based information. Community or social network rating data may be analyzed and weighting factors may be applied to the community or social network rating data. An underwriting decision for the potential entity to be insured may then be transmitted based at least in part on the community or social network rating data.

23 Claims, 4 Drawing Sheets

SYSTEMS AND METHODS FOR INTELLIGENT UNDERWRITING BASED ON COMMUNITY OR SOCIAL NETWORK DATA

CROSS-REFERENCE TO RELATED APPLICATION

The present application claims the benefit of U.S. Provisional Patent Application No. 61/447,372 entitled "SYSTEMS AND METHODS FOR INTELLIGENT UNDERWRITING BASED ON COMMUNITY AND/OR SOCIAL NETWORK DATA" and filed on Feb. 28, 2011. The entire contents of that application are incorporated herein by reference.

BACKGROUND

Underwriting of insurance policies for individuals and businesses involves the application of certain established statistical methods, detailed reviews of historical loss information coupled in with a skilled underwriter's judgment and experience. Currently, many conventional data sources are used including credit rating agency data, historical accident data, and claims data to make underwriting decisions. Furthermore, commercial underwriting poses additional difficulties in the underwriting area. Small and medium size businesses span a wide range of business types, and involve a wide range of business risks and risk characteristics, making it difficult to generate and analyze information to produce rating and pricing policies that can be reliably and consistently applied to different businesses in different geographical locations, industries and sizes.

Current underwriting processes and systems do not adequately take into account the vast array of information more recently available via the Internet. The more explosive recent growth of the Internet, and more particularly, social and business networking type of sites, has developed into a largely untapped area for potentially valuable underwriting information.

It would be desirable to provide systems and methods for underwriting by leveraging community, social and business networking information in the underwriting process.

SUMMARY OF THE INVENTION

According to some embodiments, systems, methods, apparatus, computer program code and means for underwriting using community and/or social networking based data is disclosed. In one embodiment, the invention relates to a system to intelligently underwrite insurance policies using community and/or social network based data, comprising a communication device to receive social network rating data associated with a potential entity to be insured; a processor coupled to the communication device; and a storage device in communication with said processor and storing instructions adapted to be executed by said processor to analyze said social network rating data; apply weighting factors to said social network rating data; and transmit an underwriting decision for the potential entity to be insured based at least in part on said social network rating data.

A technical effect of some embodiments of the invention is an improved and computerized insurance underwriting, rating and quoting system providing improved rate and pricing specificity and flexibility for insurance policies. With these and other advantages and features that will become hereinafter apparent, a more complete understanding of the nature of the invention can be obtained by referring to the following detailed description and to the drawings appended hereto.

DETAILED DESCRIPTION

Figure 1:
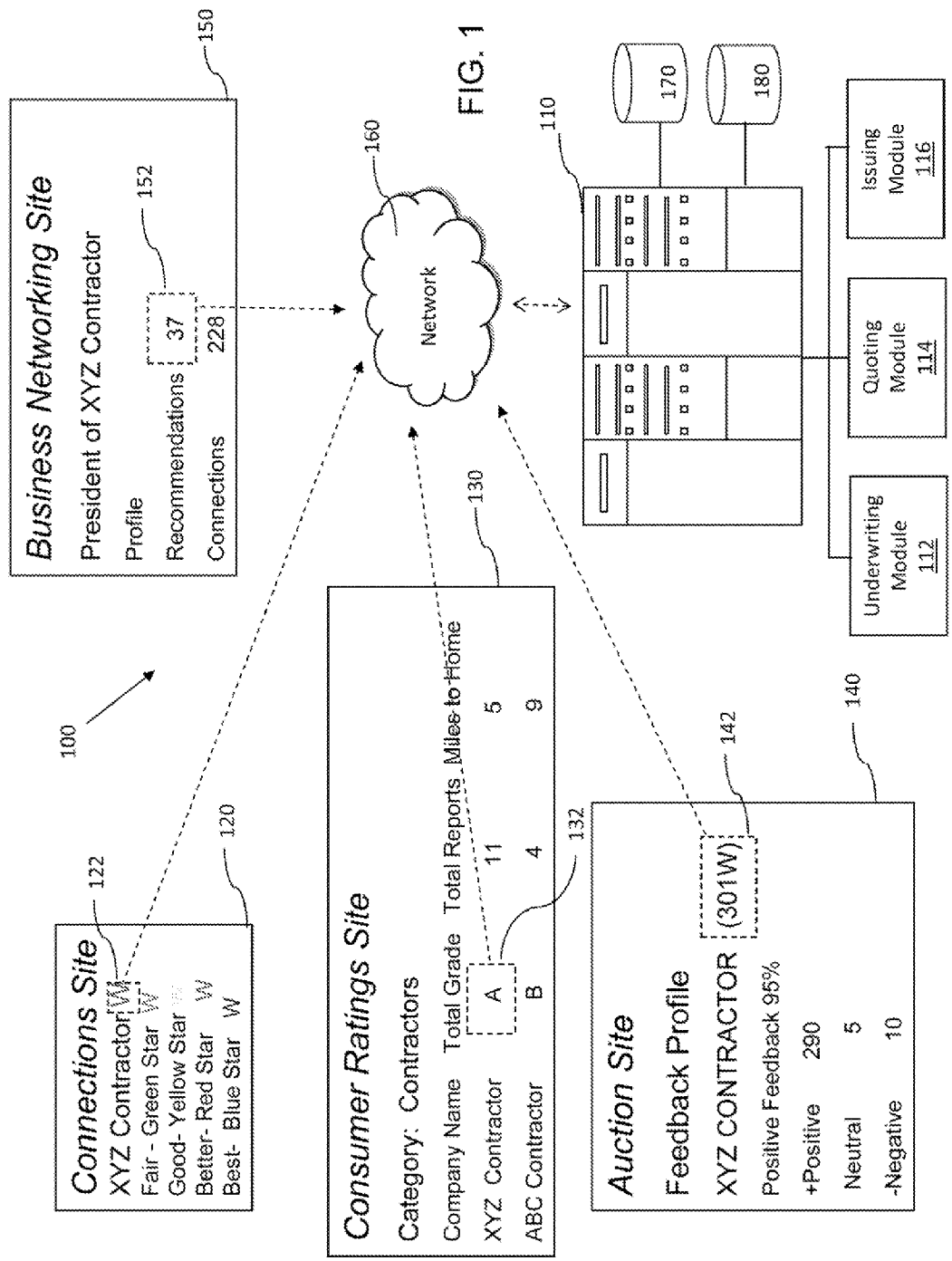
FIG. 1 is block diagram of a system according to some embodiments of the present invention.

FIG. 1 is a block diagram of an insurance underwriting system 100 according to some embodiments of the present invention. The system 100 may, for example, facilitate underwriting as well as perform the quoting, rating and pricing of certain policies using community, social and business network based data such as user ratings, profiles, reviews and recommendations. For exemplary purposes, such sites/networks may include EBAY.COM, FACEBOOK.COM, LINKEDIN.COM, ANGIESLIST.COM, TWITTER.COM, BLOGGER.COM, MYSPACE.COM, FRIENDSTER.COM, and other similar sites. In the present invention, both individual and business/commercial user ratings and recommendations from one or more of the sites may be used to underwrite, rate, offer, price, renew or otherwise evaluate insurance for one or more entities based at least in part on the social network based data.

According to some embodiments, an "automated" insurance underwriting platform 110 may be provided for accessing and evaluating the social network based data. By way of example only, the underwriting platform 110 may be associated and/or communicate with a Personal Computer (PC), an enterprise server, a database farm, and/or a consumer device. The automated insurance underwriting processing platform 110 may, according to some embodiments, perform both personal lines and commercial underwriting, create rating schedules, and price and rate individual and business policies using those rating schedules. Pursuant to some embodiments, underwriting platform 110 accesses certain social and business network rating data from sites 120, 130, 140 and 150 via network 160 to utilize for enhanced underwriting in accordance with the present invention.

As used herein, devices including those associated with the automated insurance processing platform 110, and any other device described herein may exchange information via any communication network 160 which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Sites 120, 130, 140 and 150 include certain rating information such as a star based rating 122, a grade based rating 132, a transaction based rating 142 and a recommendation based rating 152 which are used to evaluate one or more potential insureds via underwriting platform 110. Each individual rating 122-152 may be considered individually, collectively or selectively and may be combined with one or more other data sources, such as traditional underwriting data sources to perform real-time underwriting. In one embodiment, the two or more of the various ratings/scores may be combined to produce an aggregate score which may be used as an input to one or more underwriting processes.

As shown, the automated insurance processing platform 110 may include a number of modules or components, including one or more underwriting modules 112, quoting modules 114 and issuing modules 116. As will be described further below, the underwriting modules 112 may be used in conjunction with the creation and updating of one or more rating schedules for use in pricing and rating insurance policies pursuant to embodiments of the present invention. For example, in some embodiments, the underwriting modules 112 are used to analyze both conventional underwriting data such as historical loss information in conjunction with social and business network based data for use in rating and pricing business insurance policies. Referring still to FIG. 1, the quoting and issuing modules 114 and 116 may be used in conjunction with the quoting, rating and pricing of insurance policies (e.g., in response to requests for quotes received from a mobile device, web server or agents operating agent devices, etc.). Note that the underwriting module 112, quoting module 114, and/or issuing module 116 may be associated with various types of insurance policies, including automobile and home insurance policies, for individuals and/or companies.

Although a single automated insurance processing platform 110 is shown in FIG. 1, any number of such devices may be included. Moreover, various devices described herein might be combined according to embodiments of the present invention. For example, in some embodiments, the automated insurance processing platform 110 and modules 112-116 might be co-located and/or may comprise a single apparatus. In some embodiments, some or all of the underwriting analysis may be performed using a spreadsheet based program or other analytic program utilizing one or more servers or server farms in a network based environment.

The automated insurance underwriting platform 110 and the analysis modules 112 may also access information in one or more databases 170, 180. The databases may include, for example, risk characteristic data 170 and historical loss data 180 associated with previously-issued insurance policies. As will be described further below, the risk characteristic data 170 and the historical loss data 180 may be used by the analysis module 112 in the creation and updating of rating schedules for the storage in one or more rating databases 120 for use by the processing platform 110 in quoting, pricing and issuing new insurance policies.

Figure 2:
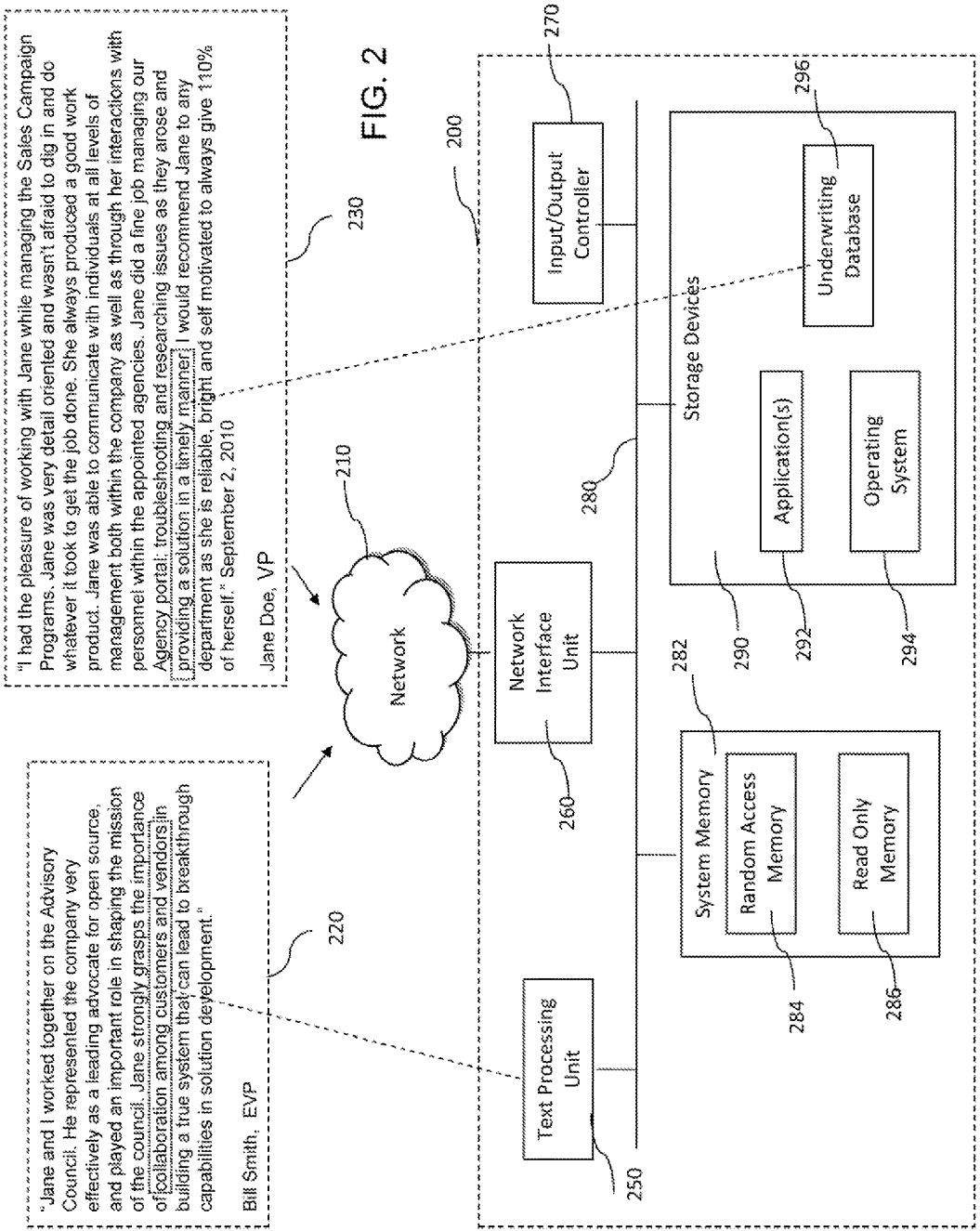
FIG. 2 is block diagram of a system according to some embodiments of the present invention.

Referring now to FIG. 2, one embodiment of the present invention is shown for utilizing social network recommendation information for insurance underwriting. System 200 communicates via network 210 to access one or more social network recommendations 220 and 230 for use in the insurance underwriting process.

System 200 also may include a computer processor or text processing unit 250. The computer processor 250 may include one or more conventional microprocessors and may operate to execute programmed instructions to provide functionality as described herein. Among other functions, the computer processor 250 may access and retrieve social network rating/recommendation information via network interface unit 260 and input/output controller 270 via system bus 280.

The computer system 200 may further include a program memory 282 that is coupled to the computer processor 250. The program memory 282 may include a random access memory 284 and a read only memory 286. System memory 282 is further coupled via bus 280 to one or more fixed storage devices 290, such as one or more hard disk drives, flash memories, tape drives or other similar storage devices. Storage devices 290 may store one or more application programs 292, an operating system 294, and one or more databases such as an underwriting database 296 for storing social network based information and/or conventional underwriting information.

System 200 may be, according to some embodiments, accessible via a Graphical User Interface (GUI) rendered at least in part by input/output controller 270. The GUI might be used, for example, to dynamically display existing insurance underwriting information, analyze social network based data and historical or demographic data to generate underwriting data, rating tables and/or pricing for one or more insurance policies.

Referring still to FIG. 2, underwriting system 200 performs processing to process and extract relevant underwriting information from accessed social network recommendation data 220 and 230. The processing and extraction of information from the social network recommendation data 220 and 230 may take one or more of a number of different forms. For example, the computer system 200 may perform certain key word searches on the text based recommendations from one or more social networks. Certain key words denoting a satisfactory or better experience with a company or vendor would positively impact the underwriting process while conversely certain key words conveying a poor or bad experience would negatively impact the underwriting process for the potential insured. Positive data may result in an approval of insurance or a reduction in premium while negative data may result in a denial of insurance or an increase in premium.

As another example, computer system 200 may perform natural language processing on the recommendation to determine whether those recommendations contain, in substance, one or more of a number of different types of statements which are relevant for underwriting. One example of natural language processing may operate to mine certain characteristic information from the various social network recommendations to determine whether a party is engaging in certain risky behavior or providing high risk products.

It is contemplated that system 200 may process recommendations in one or more languages, such English, French, Arabic, Spanish, Chinese, German, Japanese and the like. In an exemplary embodiment, underwriting analysis by system 200 also can be employed for sophisticated text analyses, wherein text can be recognized irrespective of the text language. The relationships between the various words/phrases can be clarified by using an insurance rules engines for classifying words/phrases as a predictor of certain underwriting risk.

Figure 3:
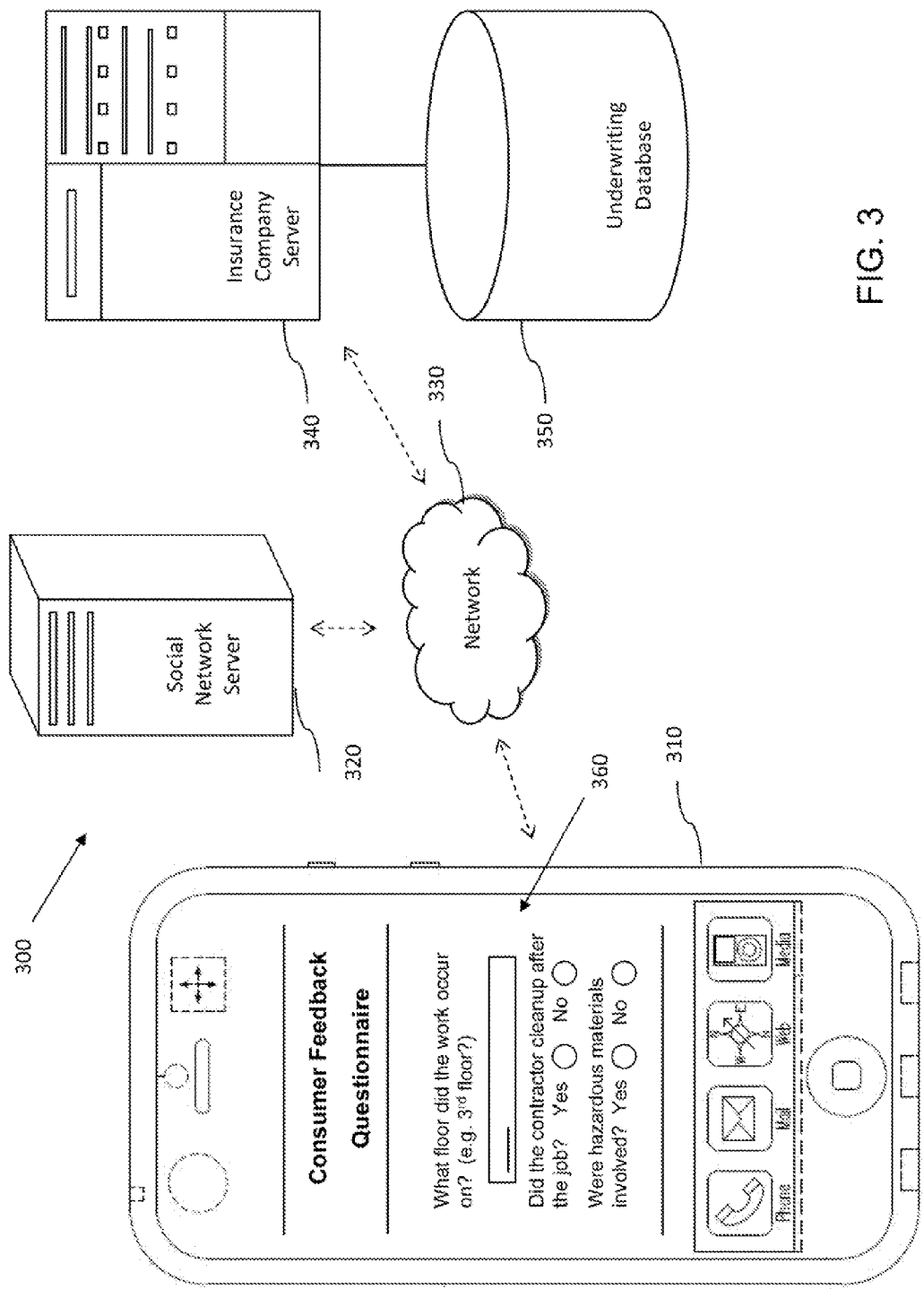
FIG. 3 is block diagram of a system according to some embodiments of the present invention.

As shown in FIG. 3, a system 300 includes a mobile device 310 in communication with a social network server 320 via network 330. Mobile device 310 may be in further communication with an insurance company 340. The mobile device 310 is coupled to capture or otherwise receive data and information associated with social network server 320. The insurance company 340 operates systems to underwrite and process insurance policies based on data received from social network server 320 and/or mobile device 310.

The mobile device 310 may be any of a number of different types of mobile devices that allow for wireless communication and that may be carried with or by a user. For example, in some embodiments, mobile device 104 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity such as social network server 320 and/or insurance company 340.

Device 310 is configured to display a feedback or recommendation input screen 360 which contains one or more underwriting based questions for transmission via network 330 to social network server 320 and/or insurance company server 340 for further storage in underwriting database 350. Underwriting based questions are specifically selected to garner specialized information about the potential insured as an input to the underwriting process related to the potential insured.

In operation, a user operating a mobile device 310 generally initiates or launches a browser application for accessing one or more social network web pages or sites. Once on the respective social network site, the user may be prompted to enter information about themselves, the vendor/contractor they used, the business they transacted with so that the mobile device may communicate with the social network server 320 and/or insurance company 340. In one embodiment, the social network server 320 will aggregate such information from a plurality of users and transmit them to insurance company server 340.

Figure 4:
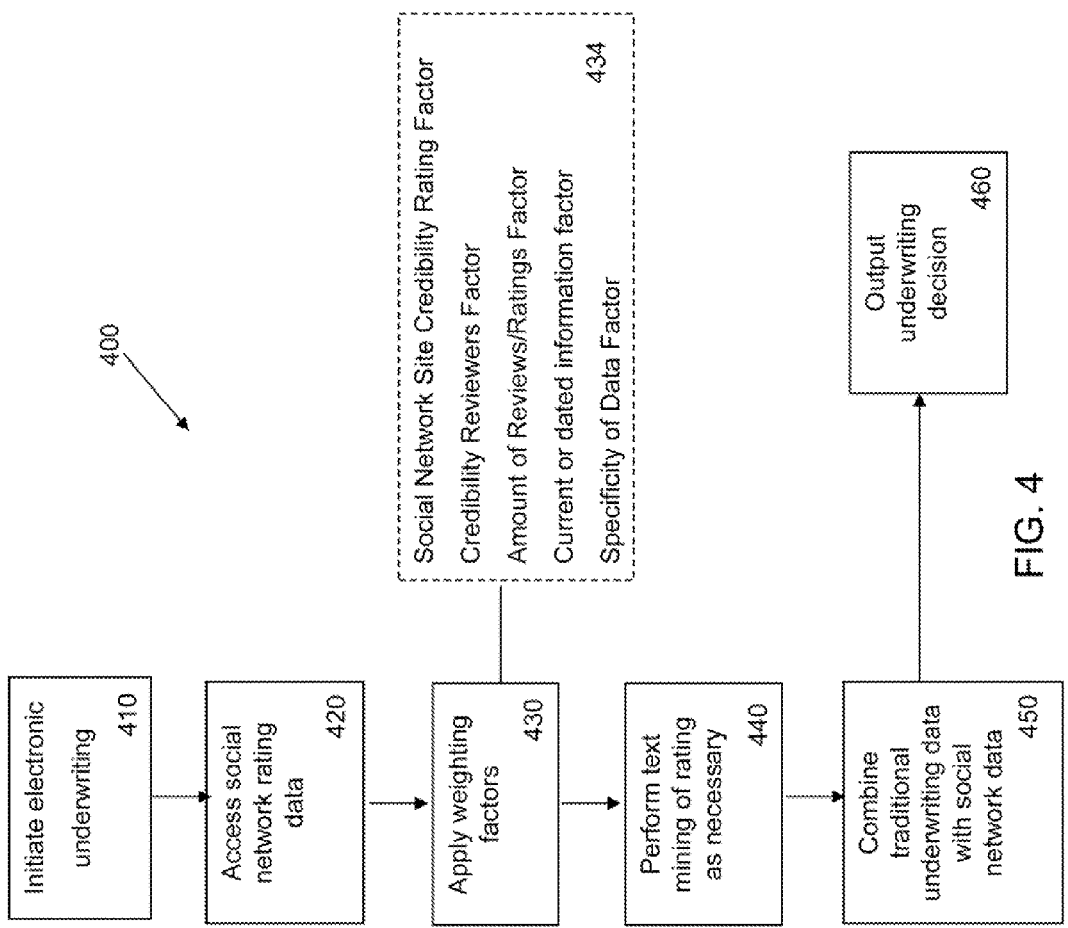
FIG. 4 illustrates a method according to some embodiments of the present invention.

FIG. 4 illustrates a method that might be performed, for example, by some or all of the elements of the system 100 described with respect to FIG. 1 or system 200 described with respect to system 2 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 400 may be performed to generate or update an underwriting database to allow the rating, quoting, pricing and issuance of insurance policies using features of the present invention. Pursuant to some embodiments, process 400 includes initiating the underwriting process 410. In one embodiment, electronic underwriting is initiated at an agent terminal or a direct to business owner terminal where an application for insurance by the potential insured triggers the electronic underwriting process. Process 400 continues with accessing social network ratings data 420. Social network rating data may be accessed via a predetermined agreement between the insurer and one or more social networks to provide the rating information from a social network database to the insurance company. Process 400 continues further by applying weighting factors 430 to the social network data. According to some embodiments, weighting factors 434 are generated and applied in step 430. For example, to allow the calculation of a professional liability insurance premium for a business, the following weighting factors may be generated and applied: Social Network Site Credibility Rating Factor, Credibility Reviewers Factor, Amount of Reviews/Ratings Factor, Current or dated information factor and Specificity of Data Factor. These factors allow more accurate and predictive pricing of business insurance premiums, and may be created and applied using the process described below in conjunction with FIG. 4.

Process 400 continues with the performing of text mining of rating information 440. In certain instances, the social networking rating data such as shown with respect to FIG. 1 may be supplemented with recommendation type data shown with respect to FIG. 2. Either or both types of data may be used in the underwriting process of the present invention including a combination of rating data from site XX and recommendation data from site YY or both types of data from the same site or multiple sites. Process 400 continues with the combining of traditional underwriting data with social network data 450 and outputting an underwriting decision 460. In one exemplary embodiment, social network based data may be combined with a description of the potential insured's operation and the standard industrial codes ("SIC"), which are associated with the potential insured's business. Each of the SIC records are linked to underwriting guidelines established by the insurance carrier and may be combined with the social network data to perform more enhanced underwriting. According to some embodiments, certain keywords (e.g., "dangerous" or "hazardous") might be looked for and, when found, used to adjust underwriting parameters.

Note that the process 400 might be performed in connection with a newly initiated electronic underwriting decision. According to some embodiments, the process 400 might be performed on a periodic basis (e.g., when an existing agreement is up for renewal). Moreover, the reviews and/or comments accessed by the process 400 might, according to some embodiments, be associated with a predetermined period of time (e.g., only the previous six months). As another approach, older reviews or comments could be given less weight as compared to newer ones.

In other embodiments, the social network data may be used in conjunction with one or more predictive models to take into account a large number of underwriting parameters. The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior data and outcomes known to the insurance company. The specific data and outcomes analyzed vary depending on the desired functionality of the particular predictive model. The particular data parameters selected for analysis in the training process are determined by using regression analysis and/or other statistical techniques known in the art for identifying relevant variables in multivariable systems. The parameters can be selected from any of the structured data parameters stored in the present system, whether the parameters were input into the system originally in a structured format or whether they were extracted from previously unstructured text, such as from text based social network recommendation data.

In the present invention, the selection of these weighting factors are to improve the predictive power of the electronic underwriting process, as well as to increase the perceived or actual fairness of ratings/recommendations on a site by site basis. For example, more established and highly frequented social network sites may be associated with a higher credibility factor, while newer, less established sites would be associated with a relatively lower credibility factor. By way of further example, more current ratings would be accorded a higher weighting while older, less current ratings or recommendations would be weighted lower.

According to some embodiments, information about a reviewer or commenter might be used to adjust one or more weighting factors. For example, an "anonymous" reviewer might be give less weight as compared to an existing customer of an insurance company. According to other embodiments, location information associated with a reviewer or commenter might be used to adjust one or more weighting factors. For example, a reviewer who posts a comment from a work site might be given more credibility as compared to other reviewers. As other examples, a reviewer who has a high reputation on a web site (e.g., a good eBay rating), who posts many reviews, and/or who has experienced a lot of transactions with the potential insured might be associated with a relatively high weighting factor.

Other factors that might be considered include: a value associated with a job (e.g., a comment about a contractor's performance in connection with a $100,000 job might be given more weight as compared to one associated with a $1,000 job) and whether a job was for inside or outside work. Moreover, the inclusion of image, video, and/or audio information might increase a weighting factor associated with a review or comment.

The system of the present invention may be used as a gate or trigger within an underwriting process to screen or refer insurance applicants for more enhanced underwriting. In some embodiments, applicants that are to be considered for possible referral for more underwriting are selected on a real-time basis according to certain pre-determined criteria. For example, the system may automatically flag or tag applicants based on a certain threshold of negative or adverse comments and/or ratings that the applicant has received in one or more online communities and/or social networks. By way of further example, a small business applying for liability insurance may be tagged for additional underwriting if they have received two or more negative feedback comments in an online community.

Note that any number of factors could be considered in connection with a pricing model. Such factors include years in business, number of locations, policy size/type, a business credit factor, and/or a total loss amount over the prior three years. In addition to the these pricing model attributes, note that other rating attributes may ne used depending on the type insurance being sold (e.g., property or general liability), especially for non-growing industry and SIC classes.

By way of example, consider a small commercial automobile insurance policy. A risk score model might include numerous individual risk characteristics and thus already impact the final premium calculation. Attributes used to calculate a risk score and to determine tier placement might include fleet size, composition of fleet (PPT vs. TTT, vehicle weight), sic/industry class, years in business, years with an insurance company, financial condition of the business, prior accident frequency, liability (including PIP), comprehensive, collision, motor vehicle record information, violations (e.g., number, severity, timing), driver's age, family members as drivers, location information, ZIP code of each location, a number of states, billing information, manual premium, separately for liability and/or physical damage. Factors may be assigned for each attribute (or in some cases based on a combination of attributes). Separate factors may, according to some embodiments, be assigned for Liability and Physical Damage. The factors for Liability might be multiplied together to produce a raw score for Liability and the same may be done for Physical Damage. The raw scores may then be averaged using the manual premium as weights. The average raw score may be translated to a Risk Score, which will have an indicated premium adjustment (tier) associated with it.

The following risk characteristics might not be included in a risk score model and instead be considered when approving additional agent requested pricing: severity and description of prior claims (if any), prior claims are minimal value, prior significant claims, existence of problem drivers (no problem drivers or 1 or more problem drivers), loss control/driver hiring practices, motor vehicle records obtained on drivers, driver training programs, low turnover, no formal loss control procedures in place, condition, safety, and maintenance of equipment, vehicles are well maintained and/or late model, no formal maintenance program, evidence of coverage lapse, evidence of continuous coverage, evidence of a gap in coverage/uninsured period, presence of other lines, coverage requested (full or restricted), primary liability limits requested (standard or non-standard).

In the present invention, an underwriting referral may be done by the system automatically e-mailing or transmitting the tagged electronic application file to an underwriter for further review. If more than one underwriter is available to receive the referral of the file, then the computer system may automatically select the underwriter who is to receive the referral based on one or more factors such as one or more attributes of the insurance/applicant, the underwriter's qualifications and/or experience, the underwriter's current workload, etc. The underwriter's role, at this point, is to review the file, confirm that the referral is warranted, proceed with further analysis/investigation of the applicant, and then make an underwriting decision based on the additional underwriting performed which was triggered by the negative social network and/or community data.

As a result of the embodiments described herein, improved underwriting, rating and pricing for personal and business insurance policies may be achieved.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems).

Applicants have discovered that embodiments described herein may be particularly useful in connection with business insurance products. Note, however, that other types of insurance products may also benefit from the invention. For example, embodiments of the present invention may be used in conjunction with the rating, pricing and quoting of personal lines policies, homeowners policies, and other types of business insurance policies. Each of these different types of insurance policies may benefit from the use of the territory and other rating approaches described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system for intelligently underwriting insurance policies using community or social network rating data, comprising:
   a communication device to receive community or social network rating data associated with a potential entity to be insured by an insurance entity, wherein the community or social network rating data is generated by a party other than the insurance entity, the party being a community or social network user and the rating data comprising one or more of a rating, a review or a recommendation by the community or social network user;
a processor coupled to the communication device; and
a storage device in communication with said processor and storing instructions adapted to be executed by said processor to:
analyze the community or social network rating data, the analyzing comprising conducting key word searches on text based recommendations of the community or social network rating data to identify recommendations indicating a satisfactory experience and recommendations indicating a poor experience;
apply weighting factors to the community or social network rating data, wherein said weighting factors comprise at least two of: a community or social network site credibility rating factor applicable to all rating data from a community or network site, a reviewer's credibility factor applicable to all rating data from one of the community or social network users, an amount of reviews/ratings factor applicable to all rating data from one of the community or social network users, a current or dated information factor, and a specificity of data factor; and
transmit an underwriting decision for the potential entity to be insured based at least in part on the community or social network rating data.

2. The system of claim 1, wherein the community or social network rating data is associated with at least one of: a star based rating, a grade based rating, a transaction based rating, and a recommendation based rating.

3. The system of claim 1, wherein the underwriting decision is further based on at least one of: historical loss information, risk information, and a standard industrial code.

4. The system of claim 1, wherein the underwriting decision is associated with at least one of: a personal insurance policy, a business insurance policy, an automobile insurance policy, and a home insurance policy.

5. The system of claim 1, wherein execution of the program instructions further cause the computer processor to:
extract relevant underwriting information from the community or social network rating data, wherein the underwriting decision is further based on the extracted relevant underwriting information.

6. The system of claim 5, wherein said extracting includes a key word search of a text based recommendation.

7. The system of claim 5, wherein said extracting includes natural language processing to mine characteristic information from the community or social network rating data.

8. The system of claim 1, wherein the community or social network rating data comprises at least one of: text information, image information, audio information, video information, and a website link.

9. The system of claim 1, wherein the underwriting decision is further based on a predictive model.

10. The system of claim 1, wherein the underwriting decision for the potential entity to be insured is transmitted responsive to a trigger event.

11. The system of claim 10, wherein the trigger event is based on information associated with an existing or potential insurance customer.

12. The system of claim 11, wherein the trigger event is associated with at least one of: an application for a new insurance policy, a request to renew an existing insurance policy, and a periodic basis.

13. The system of claim 1, wherein execution of the program instructions further cause the computer processor to:
facilitate a provision of an interactive application to the potential entity to be insured,
gather social network profile information associated with the potential entity to be insured, and
score an insurance product for the potential entity to be insured based at least in part on the community or social network rating data.

14. The system of claim 13, wherein the interactive application is associated with at least one of: a game, a survey, a calculator, a widget, and an insurance audit.

15. The system of claim 1, wherein the social network server is associated with a third party service associated with a plurality of social networks.

16. A computer-implemented method associated with underwriting decisions based on community or social network based data, comprising:
receiving, by a computer processor of an insurance server, the computer processor executing an underwriting module, community or social network rating data associated with a potential entity to be insured by an insurance entity, wherein the community or social network rating data is generated by a party other than the insurance entity, the party being a community or social network user and the rating data comprising one or more of a rating, a review or a recommendation by the community or social network user;
analyzing, by the computer processor executing the underwriting module, said community or social network rating data, the analyzing comprising conducting key word searches on text based recommendations of the community or social network rating data to identify recommendations indicating a satisfactory experience and recommendations indicating a poor experience;
automatically applying, by the computer processor executing the underwriting module, weighting factors to said community or social network rating data, wherein said weighting factors comprise at least two of: a community or social network site credibility rating factor applicable to all rating data from a community or network site, a reviewer's credibility factor applicable to all rating data from one of the community or social network users, an amount of reviews/ratings factor applicable to all rating data from one of the community or social network users, a current or dated information factor, and a specificity of data factor;
determining by the computer processor an underwriting decision for the potential entity to be insured based at least in part on said community or social network rating data; and
transmitting, by the computer processor executing the underwriting module, the underwriting decision.

17. The method of claim 16, wherein the community or social network rating data is associated with at least two of: a star based rating, a grade based rating, a transaction based rating, and a recommendation based rating.

18. The method of claim 16, wherein the underwriting decision is further based on at least one of: historical loss information, risk information, and a standard industrial code.

19. The method of claim 16, wherein the underwriting decision is associated with at least one of: a personal insurance policy, a business insurance policy, an automobile insurance policy, and a home insurance policy.

20. A non-transitory computer-readable medium storing instructions adapted to be executed by a computer processor to perform a method, said method comprising:
receiving, at underwriting module of an insurance server, community or social network rating data associated with a potential entity to be insured by an insurance entity, wherein the community or social network rating data is generated by a party other than the insurance entity, the party being a community or social network user and the rating data comprising one or more of a rating, a review or a recommendation by the community or social network user;

analyzing the community or social network rating data, the analyzing comprising conducting key word searches on text based recommendations of the community or social network rating data to identify recommendations indicating a satisfactory experience and recommendations indicating a poor experience;

automatically applying, by the underwriting module, weighting factors to the community or social network rating data, wherein said weighting factors comprise at least two of: a community or social network site credibility rating factor applicable to all rating data from a community or network site, a reviewer's credibility factor applicable to all rating data from one of the community or social network users, an amount of reviews/ratings factor applicable to all rating data from one of the community or social network users, a current or dated information factor, and a specificity of data factor; and transmitting an underwriting decision for the potential entity to be insured based at least in part on the community or social network rating data.

21. The medium of claim 20, wherein the underwriting decision for the potential entity to be insured is transmitted responsive to a trigger event.

22. The medium of claim 21, wherein the trigger event is based on information associated with an existing or potential insurance customer.

23. The medium of claim 21, wherein the trigger event is associated with at least one of: an application for a new insurance policy, a request to renew an existing insurance policy, and a periodic basis.

* * * * *